6/11/85 4,522,771

United States Patent [19]

McLoughlin

[11] Patent Number: 4,522,771

[45] Date of Patent: Jun. 11, 1985

[54] METHOD OF FABRICATING LAYER INSULATION FOR USE IN HIGH-VOLTAGE ELECTRICAL EQUIPMENT

[75] Inventor: Joseph R. McLoughlin, Burnt Hills, N.Y.

[73] Assignee: General Electric Company, Schenectady, N.Y.

[21] Appl. No.: 510,534

[22] Filed: Jul. 5, 1983

Related U.S. Application Data

[60] Division of Ser. No. 435,856, Oct. 21, 1982, Pat. No. 4,410,585, which is a continuation of Ser. No. 239,296, Mar. 2, 1981, abandoned.

[51] Int. Cl.[3] .......... B32B 7/02

[52] U.S. Cl. .......... 264/61; 106/99; 156/89; 264/122

[58] Field of Search .......... 156/89, 61.2, 61.8; 264/61, 58, 60, 63, 122, 125; 428/703, 325, 283, 288, 215; 174/118, 122 R, 122 G, 137 B, 138 G; 336/206, 199; 106/90, 99, 98, 97

[56] References Cited

U.S. PATENT DOCUMENTS

| | | | |
|---|---|---|---|
| 3,711,807 | 1/1973 | Yamashita et al. | 336/206 |
| 4,278,720 | 7/1981 | Shannon | 428/198 |

*Primary Examiner*—Michael Ball

*Attorney, Agent, or Firm*—Bernard J. Lacomis; James C. Davis

[57] ABSTRACT

A method of fabricating a layer insulation for use in high voltage electrical equipment by applying a mixture of inorganic particles, inorganic cement, and a fluid carrier vehicle for the cement to an intermingled array of inorganic fibers.

17 Claims, 3 Drawing Figures

METHOD OF FABRICATING LAYER INSULATION FOR USE IN HIGH-VOLTAGE ELECTRICAL EQUIPMENT

This application is a division of application Ser. No. 435,856, filed 10/21/82, now U.S. Pat. No. 4,410,585, which is a continuation of application Ser. No. 239,296, filed on 3/2/81, now abandoned.

BACKGROUND OF THE INVENTION

The present invention relates to layer insulation for use in high-voltage electrical equipment and more particularly to such layer insulation comprising substantially all inorganic material.

Layer insulation has a generally planar configuration and is used in high-voltage electrical equipment such as distribution transformers to provide insulation between adjacent "layers" of a winding thereof. (As used herein, the term "high-voltage" is intended to signify a typical power level voltage.) Layer insulation is typically impregnated with oil to improve the dielectric and heat removal properties thereof. A known layer insulation comprises cellulose paper. Cellulose paper is subject to various disadvantages when used as layer insulation. First, cellulose paper has low hydrolytic stability, or resistance to degradation by water which may come into contact with cellulose paper. Second, cellulose paper degrades rapidly at temperatures in excess of about 165° C. which can occur in high-voltage electrical equipment such as a distribution transformer due to electrical overloads or to localized "hot spots" in a winding thereof. At such temperatures, cellulose paper becomes brittle and, further, the resistance of the paper to degradation by water becomes lowered. Additionally, prolonged exposure of cellulose paper which is impregnated with oil to temperatures in excess of about 180° C. causes the paper to become carbonized due to the lack of oxygen. This can occur with cellulose paper because it is organic material and therefore contains the carbon atoms necessary for carbonization. Because carbonization results in a path of relatively high conductance, a severe degradation of the dielectric property of the cellulose paper occurs.

OBJECTS OF THE INVENTION

Accordingly, it is an object of the present invention to provide layer insulation for use in high-voltage electrical equipment which has an elevated hydrolytic stability or resistance to degradation by water as compared with cellulose paper.

It is a further object of this invention to provide layer insulation for use in high-voltage electrical equipment which has a high resistance to degradation at temperatures which may typically run 165° C. or higher.

It is yet a further object of this invention to provide layer insulation for use in high-voltage electrical equipment with the raw materials of such insulation typically having a low cost relative to the raw material for cellulose paper.

It is still a further object of this invention to provide layer insulation for use in high-voltage electrical equipment which possesses increased thermal conductivity relative to cellulose paper.

Further objects and advantages of the present invention will become apparent from a reading of the remainder of this specification in conjunction with the drawing figures.

SUMMARY OF THE INVENTION

In carrying out the invention in one form, there is provided a method of fabricating layer insulation for use in high-voltage electrical equipment. The method comprises applying a mixture of inorganic particles, inorganic cement, and a fluid carrier vehicle for the cement to an intermingled array of inorganic fibers. The product of the foregoing mixture is then pressed into a layer having a generally planar configuration, with the inorganic fibers reinforcing the layer. Finally, the fluid carrier vehicle is removed from the layer, thereby curing it.

In carrying out the invention in another form there is provided layer insulation for use in high-voltage electrical equipment. The layer insulation comprises an intermingled array of inorganic fibers, inorganic particles, and inorganic cement. The inorganic particles are bonded together and to the inorganic fibers with the inorganic cement to form a generally planar insulation layer reinforced by the inorganic fibers.

DETAILED DESCRIPTION OF A SPECIFIC EMBODIMENT

Figure 1:
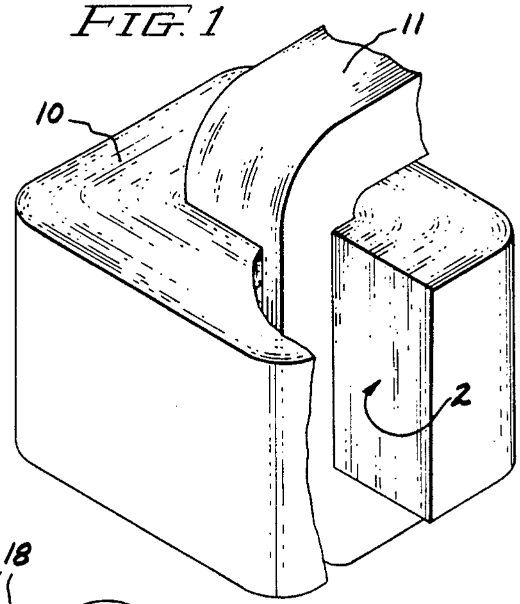
FIG. 1 is a diagrammatic view in perpsective of primary and secondary windings of a distribution transformer wound about a portion of a magnetic core with part of these windings removed to facilitate understanding of the view of FIG. 2.

There is shown in FIG. 1 a set of primary and secondary windings 10 wound around a magnetic core 11 of a distribution transformer. Part of the set of windings 10 is broken away to expose a vertical, cross-sectional view thereof. An arrow 2 pointing to this vertical, cross-sectional surface indicates where the enlarged view of FIG. 2 is taken.

Figure 3:
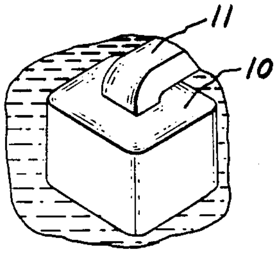
FIG. 3 is a diagrammatic view similar to FIG. 1 showing part of a distribution transformer in an oil bath.
Figure 2:
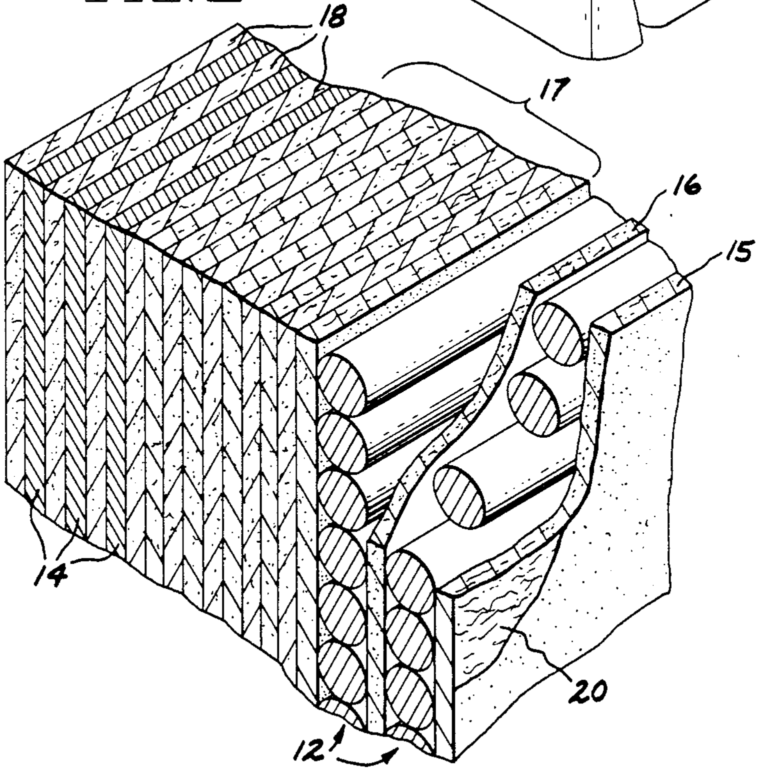
FIG. 2 is an enlarged, perspective view of a winding structure taken from the cut surface where an arrow 2 points in FIG. 1.

Referring now to FIG. 2, there is shown a pair of adjacent, primary winding layers 12 each of which comprises vertically aligned "turns" (about the magnetic core 11) of a round conductor. Radially inward of the primary winding layers 12 are three, adjacent, secondary winding layers 14 each of which comprises a singular metallic foil layer. The layer insulation of the present invention is used for the insulation layers 15 and 16 and the pluralities of layers 17 and 18. These insulation layers typically are impregnated with oil and are placed in an oil bath, as indicated in FIG. 3.

Referring back to FIG. 2, the insulation layers 15 and 16 are used between adjacent, primary winding layers (such as the layer 16 between the pair of primary winding layers 12). The plurality of insulation layers 17 serves as the main gap insulation between the primary winding and the secondary winding of the transformer. The plurality of insulation layers 18 are each disposed between adjacent secondary winding layers.

To simplify the remaining discussion, only the insulation layer 15 is referred to, because it is exemplary of the other insulation layers. The insulation layer 15 is partially broken away at 20 to expose an intermingled array of inorganic fibers, typically comprising only 1–10% volume of the insulation layer 15, The portion of the insulation layer 15 which is broken away comprises inorganic particles normally held together and to the glass fibers by an inorganic cement.

The inorganic fibers may be comprised of glass, alumina or quartz. These fibers must be thin enough to be able to bend around the smallest diameter of curvature used in a distribution transformer or other high-voltage electrical equipment. The fibers should be long enough to intermingle with each other and reinforce the insulation layer 15. Such reinforcing is desirable to materially aid the insulation layer 15 in mechanically supporting the turn or turns of the radially inward, adjacent one of the winding layers 10 (FIG. 1) during the winding process thereof. The overall thickness of the intermingled array of fibers should be close to the desired thickness of the insulation layer 15 for the following reasons. First, the fibers serve to hold the inorganic particles together and thereby maintain the integrity of the insulation layer 15. Second, the fibers play a major role in spacing the primary and secondary winding layers 10 as they are being wound around the magnetic core 11. Typical dimensions for the inorganic fibers when comprised of glass are 0.2 mils thick and 1 inch long.

The inorganic fibers by themselves can be advantageously bonded together (preferably with an inorganic cement) before the inorganic particles are applied to them. Advantageously, they would be bonded so as to form a bonded mat of fibers which typically would comprise 90–99% voids.

The inorganic particles may be comprised of gypsum, silica, calcium carbonate, mica, clay, titanium dioxide, and magnesium oxide, or other inorganic particles possessing the property of high electrical resistance. The maximum diameters of the particles are limited by the consideration of avoiding voids in the insulation layer 15 which are large enough to impair the dielectric properties thereof.

The inorganic cement which bonds the inorganic particles together and to the inorganic fibers is suitable comprised of a powder of silicate, phosphate, gypsum, or alumina silicate, or other inorganic cements possessing the property of compatability with a fluid carrier vehicle which serves to either disperse or dissolve the inorganic cement. The fluid carrier vehicle advantageously comprises water which is non-toxic. Alternatively, the fluid carrier vehicle could comprise an organic solvent, such as ethylene glycol, which can be suitably used in conjunction with water.

A typical procedure for fabricating the layer insulation 15 comprises mixing together the inorganic particles, the inorganic cement, and the fluid carrier vehicle for the cement. Advantageously, the inorganic particles are mixed in after the cement and the fluid carrier vehicle have been mixed. These materials are advantageously mixed into a paste form and then applied to an intermingled array of the inorganic fibers. By way of example, suitable weight proportions for the following specific components of the foregoing mixture are 100 parts silica (inorganic particles); 180 parts sodium silicate (inorganic cement); and 120 parts water (fluid carrier vehicle). The resulting product of the foregoing procedure is thereafter pressed into the insulation layer 15 having a generally planar configuration of typically 1–10 mils thickness, with the inorganic fibers reinforcing the layer 15. Such reinforcing is desirable to materially aid the insulation layer 15 in mechanically supporting the turn or turns of the radially inward, adjacent one of the winding layers 10 during the winding process thereof. It is desirable that the thus pressed insulation layer 15 be substantially free of large voids or voids passing through the layer 15 so as not to impair the dielectric properties thereof. The foregoing pressing procedure should take this into account by providing appropriate pressure advantageously by means of hydrostatic or mechanical pressure.

While there is still fluid carrier vehicle present in the thus formed layer 15, the layer 15 is wound into the final position thereof in a distribution transformer or other high-voltage electrical equipment. Advantageously, evaporation of the fluid carrier vehicle is substantially retarded from the insulation layer 15 until it is placed into such final position. This aids in maintaining the flexibility of the layer 15 during the process of winding it about the magnetic core 11. Such retardation of evaporation of this fluid carrier vehicle suitably is accomplished where the fluid carrier vehicle comprises water by adding a plasticizer which is miscible with the water and which has a slower evaporation rate than the water. Suitable plasticizers for water comprise ethylene glycol, glycerine, 2,2-dihydroxy dipropyl ether, acetic acid, 2-ethoxy ethyl ester, and diethylene glycol. Once the thus formed layer 15 is in the final position thereof, the remaining fluid carrier vehicle is removed therefrom. This is suitably accomplished by the conventional process of application of heat and vacuum to the electrical equipment incorporating the layer 15.

The insulation layer 15 is advantageously next impregnated with oil, such as mineral oil, and typically is placed in an oil bath as indicated in FIG. 3. Due to the substantially higher resistance of the insulation layer 15 to degradation at high temperatures (for example, above about 165° C.), oil with corresponding substantially higher resistance to degradation at high temperature, such as silicone oil, could be advantageously used. As a result of so using oil with high resistance to degradation at high temperatures, a given transformer or other high voltage electrical equipment can have a higher peformance rating than if mineral oil were used for the oil therein.

The present invention provides an inorganic insulation layer 15 having an elevated hydrolytic stability or resistance to degradation by water as compared with the prior art, cellulose paper. Further, the layer 15 is resistant to degradation at temperatures much higher than is the case with layer insulation formed of cellulose paper. Additionally, the raw materials for the insulation layer 15 are likely to have a low cost relative to the raw material for cellulose paper. A further advantage of the insulation layer 15 is that it possesses higher thermal conductivity than does cellulose paper, whereby a given distribution transformer or other high-voltage electrical equipment can have a higher performance rating than if cellulose paper were used for the layer insulation therein. The insulation layer 15 provides the still further advantage over the cellulose paper of being more readily adaptable to being formed with a thickness dimension which varies along the length and width dimensions thereof so as to provide the minimum necessary thickness to achieve the desired dielectric strength at each point. This would allow a reduction in the average thickness of the insulation layer 15, thereby resulting in a reduction in space that the set of windings 10 occupies.

While the invention has been described with respect to a specific embodiment, modifications thereof will occur to persons skilled in the art. For example, the intermingled array of inorganic fibers may comprise a woven fabric. Further, the layer insulation of the present invention will be useful in high-voltage equipment other than a distribution transformer as specifically described below. These and all such modifications are intended to fall within the true spirit and scope of the appended claims.

What I claim as my invention and desire to have secured by Letters Patent of the United States is:

1. The method of fabricating layer insulation for use in high-voltage electrical equipment, consisting essentially of:

(a) applying a mixture of inorganic particles, inorganic cement, and a fluid carrier vehicle for said cement to an intermingled array of inorganic fibers;

(b) pressing the product of (a) into a single layer having a generally planar configuration, said inorganic fibers reinforcing said layer to bond said inorganic particles together and the said inorganic fibers with said inorganic cement; and (c) removing said fluid carrier vehicle from said layer.

2. The method of claim 1 wherein said layer has a thickness in the range of approximately 1 mil to 10 mils.

3. The method of claim 1 wherein the thickness of said intermingled array of fibers is substantially the same as the thickness of said layer.

4. The method of claim 1 wherein said inorganic fibers comprise a material selected from the group consisting of glass, alumina, and quartz.

5. The method of claim 1 wherein said inorganic fibers comprise glass.

6. The method of claim 1 wherein said inorganic particles comprise a material selected from the group consisting of gypsum, silica, calcium carbonate, mica, clay, titanium dioxide, and magnesium dioxide.

7. The method of claim 1 wherein said fluid carrier vehicle comprises water.

8. The method of claim 1 wherein said inorganic cement comprises a material selected from the group consisting of silicate, phosphate, gypsum, and alumino silicate.

9. The method of claim 1 wherein said mixture of inorganic particles, said inorganic cement, and said fluid carrier vehicle for said cement are mixed into a paste form before being applied to said inorganic fibers.

10. The method of claim 1 further consisting essentially of placing said layer into the final position thereof in electrical equipment prior to the completion of removing said vehicle from said layer.

11. The method of claim 10 further consisting essentially of substantially retarding evaporation of said fluid carrier vehicle from the product of (a) until said layer is placed into the final position thereof in the electrical equipment.

12. The method of claim 11 wherein said substantially retarding evaporation of said fluid carrier vehicle from the product of (a) comprises mixing a plasticizer with said vehicle.

13. The method of claim 12 wherein said plasticizer comprises a material selected from the group consisting of ethylene glycol, glycerine, 2, 2′ dihydroxy dipropyl ether, acetic acid, 2-ethoxy ethyl ester, and diethylene glycol.

14. The method of claim 1 further consisting essentially of impregnating said layer with oil after removing said fluid carrier vehicle from said layer.

15. The method of claim 14 wherein said oil comprises an oil with a substantially higher resistance to degradation at temperatures above about 165° centigrate relative to mineral oil.

16. The method of claim 1 wherein said removal of said fluid carrier vehicle from said layer is accomplished through the application of heat.

17. The method of claim 1 wherein said removal of said fluid carrier vehicle from said layer is accomplished through the application of heat and vacuum.

* * * * *